US009988547B2

(12) United States Patent
Bohling et al.

(10) Patent No.: US 9,988,547 B2
(45) Date of Patent: Jun. 5, 2018

(54) PHOSPHORUS ACID FUNCTIONALIZED OPAQUE POLYMER

(71) Applicants: Dow Global Technologies LLC, Midland, MI (US); Rohm and Haas Company, Philadelphia, PA (US)

(72) Inventors: James C. Bohling, Lansdale, PA (US); Wei Gao, Fort Washington, PA (US); Michael W. Leonard, Collegeville, PA (US); Qing Zhang, Lansdale, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 269 days.

(21) Appl. No.: 14/949,159

(22) Filed: Nov. 23, 2015

(65) Prior Publication Data

US 2016/0152854 A1  Jun. 2, 2016

Related U.S. Application Data

(60) Provisional application No. 62/085,740, filed on Dec. 1, 2014.

(51) Int. Cl.
| | | |
|---|---|---|
| C09D 125/12 | (2006.01) |
| C08F 275/00 | (2006.01) |
| C08J 3/18 | (2006.01) |
| C09D 133/08 | (2006.01) |
| C09C 1/36 | (2006.01) |
| C08J 3/205 | (2006.01) |
| C09C 3/10 | (2006.01) |
| C09D 5/02 | (2006.01) |
| C09D 7/12 | (2006.01) |
| C08F 265/04 | (2006.01) |
| C08F 285/00 | (2006.01) |
| C08F 8/44 | (2006.01) |
| C08K 3/22 | (2006.01) |
| C09D 17/00 | (2006.01) |

(52) U.S. Cl.
CPC .............. *C09D 125/12* (2013.01); *C08F 8/44* (2013.01); *C08F 265/04* (2013.01); *C08F 275/00* (2013.01); *C08F 285/00* (2013.01); *C08J 3/18* (2013.01); *C08J 3/205* (2013.01); *C08K 3/22* (2013.01); *C09C 1/3676* (2013.01); *C09C 3/10* (2013.01); *C09D 5/027* (2013.01); *C09D 5/028* (2013.01); *C09D 7/125* (2013.01); *C09D 7/1275* (2013.01); *C09D 7/1291* (2013.01); *C09D 17/008* (2013.01); *C09D 133/08* (2013.01); *C01P 2004/62* (2013.01); *C08F 2800/20* (2013.01); *C08J 2333/12* (2013.01); *C08J 2425/12* (2013.01); *C08J 2433/08* (2013.01); *C08K 2003/2241* (2013.01); *C08L 2207/53* (2013.01)

(58) Field of Classification Search
CPC ... C08F 275/00; C08F 285/00; C08L 2207/53
See application file for complete search history.

(56) References Cited

U.S. PATENT DOCUMENTS 7,691,942 B2 * 4/2010 Bardman .............. C08F 265/06
524/800

* cited by examiner

*Primary Examiner* — Vickey Nerangis
(74) *Attorney, Agent, or Firm* — Reid S. Willis

(57) ABSTRACT

The present invention relates to opaque polymers functionalized with phosphorus acid groups, composites of $TiO_2$ particles and the opaque polymers, and methods for their preparation. The composites are useful in coatings formulations and have been shown to exhibit improved hiding benefits in coated substrates over compositions containing non-functionalized opaque polymer and $TiO_2$.

12 Claims, No Drawings

PHOSPHORUS ACID FUNCTIONALIZED OPAQUE POLYMER

BACKGROUND OF THE INVENTION

The present invention relates to a phosphorus acid functionalized opaque polymer, which is useful as an additive in pigmented coating formulations.

Opaque polymers are well known as additives in pigmented coating formulations such as paints and are used to improve hiding of coated substrates. Opaque polymers are used to reduce the load of the comparatively expensive $TiO_2$ in formulations without sacrificing hiding, or to maintain the same levels of $TiO_2$ to improve hiding. Opaque polymers can be prepared, for example, as described in U.S. Pat. No. 6,020,435.

It would be an advance in the field of pigmented coating compositions to discover an additive with improved hiding capability.

SUMMARY OF INVENTION

The present invention addresses a need in the art by providing a method for preparing an aqueous dispersion of phosphorus acid functionalized core-shell polymer particles comprising the steps of a) contacting under emulsion polymerization conditions i) a first monomer emulsion with ii) an aqueous dispersion of carboxylic acid functionalized polymer particles having an average particle size of from 80 to 180 nm to form an aqueous dispersion of core-shell polymer particles; then b) plasticizing the shell portion of the core-shell polymer particles with a polymerizable plasticizing agent; then c) contacting the core-shell polymer particles with an aqueous base to swell the core without substantially polymerizing the plasticizing agent; then d) polymerizing the plasticizing agent;
wherein the first monomer emulsion comprises a) from 0.1 to 5 weight percent of a phosphorus acid monomer, based on the weight of the monomers in the first monomer emulsion; and b) from 50 to 99.8 weight percent of a first nonionic ethylenically unsaturated monomer which, when polymerized, has a $T_g$ of at least 50° C. and a refractive index of at least 1.4; and c) from 0.1 to 15 weight percent of a carboxylic acid functionalized monomer;
wherein the acid functionalized polymer particles comprise from 20 to 50 weight percent structural units of a carboxylic acid monomer, based on the weight of the polymer particles; and 50 to 80 weight percent of structural units of a second nonionic ethylenically unsaturated monomer;
wherein the plasticizing agent comprises from 7 to 30 percent of a third nonionic ethylenically unsaturated monomer based on the weight of the polymer particles;
wherein the phosphorus acid functionalized core-shell polymer particles have an average particle size in the range of 250 nm to 1.6 µm.

The phosphorus acid functionalized core-shell polymer particles are useful in forming composite with $TiO_2$ particles, which composites improve hiding efficiency in paint formulations.

DETAILED DESCRIPTION OF THE INVENTION

In a first aspect, the present invention is a method for preparing an aqueous dispersion of phosphorus acid functionalized core-shell polymer particles comprising the steps of a) contacting under emulsion polymerization conditions i) a first monomer emulsion with ii) an aqueous dispersion of carboxylic acid functionalized polymer particles having an average particle size of from 80 to 180 nm to form an aqueous dispersion of core-shell polymer particles; then b) plasticizing the shell portion of the core-shell polymer particles with a polymerizable plasticizing agent; then c) contacting the core-shell polymer particles with an aqueous base to swell the core without substantially polymerizing the plasticizing agent; then d) polymerizing the plasticizing agent;
wherein the first monomer emulsion comprises a) from 0.1 to 5 weight percent of a phosphorus acid monomer, based on the weight of the monomers in the first monomer emulsion; and b) from 50 to 99.8 weight percent of a first nonionic ethylenically unsaturated monomer which, when polymerized, has a $T_g$ of at least 50° C. and a refractive index of at least 1.4; and c) from 0.1 to 15 weight percent of a carboxylic acid functionalized monomer;
wherein the acid functionalized polymer particles comprise from 20 to 50 weight percent structural units of a carboxylic acid monomer, based on the weight of the polymer particles; and 50 to 80 weight percent of structural units of a second nonionic ethylenically unsaturated monomer;
wherein the plasticizing agent comprises from 7 to 30 percent of a third nonionic ethylenically unsaturated monomer based on the weight of the polymer particles;
wherein the phosphorus acid functionalized core-shell polymer particles have an average particle size in the range of 250 nm to 1.6 µm.

The first monomer emulsion comprises from 0.1, preferably from 0.2, more preferably from 0.5 weight percent, to 5, more preferably to 3, and most preferably to 2 weight percent of a phosphorus acid monomer, based on the weight of monomers in the first monomer emulsion. The first monomer emulsion further comprises, based on the weight of monomers in the first monomer emulsion, from 50, more preferably from 70, and most preferably from 85 weight percent, to 99.8, and more preferably to 95 weight percent of a first nonionic ethylenically unsaturated monomer which, when polymerized, has a $T_g$ of greater than 50° C. as calculated by the Fox equation and a refractive index ($R_f$) of at least than 1.4.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl methacrylates, including phosphoethyl methacrylate and phosphopropyl methacrylates, with phosphoethyl methacrylate being especially preferred. "Phosphoethyl methacrylate" (PEM) is used herein to refer to the following structure:

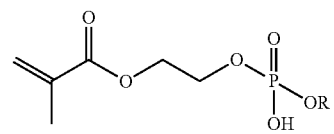

where R is H or

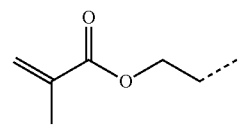

wherein the dotted line represents the point of attachment to the oxygen atom.

Examples of suitable first nonionic ethylenically unsaturated monomers include styrene, methyl methacrylate, acrylonitrile, and t-butyl acrylate, as well as combinations thereof. Styrene or a combination of styrene and acrylonitrile are preferred monomers. When styrene and acrylonitrile are both used, the preferred w/w ratio of styrene to acrylonitrile is from 98:2 to 85:15.

The first monomer emulsion further comprises from 0.1, preferably from 0.2, and more preferably from 0.5 weight percent, to 15, more preferably to 10, and most preferably to 5 weight percent of a carboxylic acid functionalized monomer, based on the weight of the monomers in the first monomer emulsion. Examples of suitable carboxylic acid functionalized monomers include acrylic acid, methacrylic acid, maleic acid, fumaric acid, and itaconic acid, with acrylic acid or methacrylic acid being preferred.

The first monomer emulsion may include other monomers. For example, the first monomer emulsion may include a polyethylenically unsaturated monomer at a concentration from 0.1, more preferably from 0.2, to preferably 20, more preferably to 5, and most preferably to 2 weight percent, based on the weight of monomers in the first monomer emulsion. Preferred polyethylenically unsaturated monomers are diethylenically unsaturated monomers and triethylenically unsaturated monomers such as allyl methacrylate (ALMA), divinyl benzene (DVB), ethylene glycol diacrylate (EGDA), ethylene glycol dimethacrylate (EGDMA), trimethylolpropane triacrylate (TMPTA), and trimethylolpropane trimethacrylate (TMPTMA).

The carboxylic acid functionalized polymer particles comprise a) preferably from 25, and more preferably from 32 weight percent, to 50, preferably to 40, and more preferably to 36 weight percent structural units of a carboxylic acid monomer, preferably acrylic acid or methacrylic acid, based on the weight of the polymer particles; and b) preferably from 60, and more preferably from 64 weight percent, to preferably to 75, and more preferably to 68 weight percent structural units of a second nonionic ethylenically unsaturated monomer, based on the weight of the acid functionalized polymer particles. Examples of preferred second nonionic ethylenically unsaturated monomers include methyl methacrylate and styrene, with methyl methacrylate being more preferred. The acid functionalized polymer particles preferably have an average diameter of from 100 nm, more preferably from 125 nm to preferably 160 nm, more preferably to 150 nm, and most preferably to 140 nm, as determined by a BI90 Plus Particle Size Analyzer.

The first monomer emulsion and the aqueous dispersion of acid functionalized polymer particles are contacted together under emulsion polymerization conditions to form an aqueous dispersion of core-shell polymer particles. Preferably, the phosphorus acid monomer portion of the first monomer emulsion is added to a vessel containing the aqueous dispersion of polymer particles in a staged fashion such that all of the phosphorus added monomer is added to the reaction vessel over a shorter period of time than the other monomers of the monomer emulsion. More preferably, the phosphorus acid monomer is added over a period that is less than 60%, of the total monomer emulsion time of addition. Most preferably, the phosphorus acid monomer addition is delayed until 40% to 75% of the monomer emulsion, absent the phosphorus acid monomer, is added to the reaction vessel. It has been surprisingly discovered that staging of the addition of the phosphorus acid monomer has a marked effect on the extent of composite formation, which, in turn advantageously impacts the hiding observed in the final coated product.

The polymerization is allowed to proceed to a desired degree of conversion of monomer in the first monomer emulsion, preferably at least 90%, more preferably at least 95%, and most preferably at least 98% conversion of monomers; once the desired degree of conversion is achieved, the reaction is preferably inhibited to stop or substantially stop the polymerization of unreacted residual monomer. Inhibition is preferably carried out using an inhibitor or a redox pair. Examples of suitable inhibitors include 4-hydroxy-2,2,6,6-tetramethylpiperidin-1-oxyl, (4-hydroxy-TEMPO), 2,2,6,6-tetramethylpiperidin-1-oxyl (TEMPO), monomethyl ether hydroquinone (MEHQ), and 4-t-butyl catechol. Examples of suitable redox pairs include combinations of an oxidant such as t-butyl hydroperoxide (t-BHP); t-amyl hydroperoxide (t-AHP), sodium persulfate (NaPS), ammonium persulfate (APS), and hydrogen peroxide, with a reductant such as isoascorbic acid (IAA), sodium bisulfite, and sodium sulfate. It is also possible, though not necessarily preferable, to stop or substantially stop polymerization by allowing the reaction to run to completion or substantial completion.

A polymerizable plasticizing agent is then contacted with the phosphorus acid functionalized core-shell polymer particles to plasticize the shell, thereby providing a means for the subsequently added aqueous base to penetrate the shell (with concomitant swelling of the polymer particles) and fill the core with water neutralized to a pH of at least 6, more preferably at least 7, to 10 more preferably to 9. Examples of suitable bases include alkali metal hydroxides, alkaline earth metal hydroxides, alkali metal carbonates, alkaline earth metal carbonates, amines, and $NH_4OH$, with NaOH, KOH, and $NH_4OH$ being particularly preferred bases.

The polymerizable plasticizing agent can be any ethylenically unsaturated monomer but is preferably either a monomer having a $T_g$ of greater than 50° C. (that is, the homopolymer of the monomer has a $T_g$ of greater than 50° C. as calculated by the Fox equation) or a low $T_g$ monomer copolymerized with a crosslinking agent. Examples of preferred polymerizable plasticizing agents include styrene or methyl methacrylate, or a combination of butyl acrylate and divinyl benzene or allyl methacrylate.

The polymerizable plasticizing agent is used at a concentration of preferably from 10, and more preferably from 12 weight percent, to preferably to 25, and more preferably to 20 weight percent, based on the weight of the core-shell polymer particles. It is understood that the polymerizable plasticizing agent may include unreacted monomer from the first monomer emulsion; although not preferred, it is possible that the polymerizable plasticizing agent arises entirely from unreacted monomer. It is preferred however, that additional polymerizable plasticizing agent be contacted with the aqueous dispersion of core-shell polymer particles.

Once the polymer particles have swollen to their desired levels, the polymerizable plasticizing agent is then polymerized. It is preferred that less than 1%, more preferably less than 0.1%, and most preferably less than 0.01% of residual polymerizable plasticizing agent remains after this polymerization step.

The phosphorus acid functionalized polymer particles are advantageously admixed with pigment particles such as an aqueous slurry of $TiO_2$ particles—especially $TiO_2$ particles surface-treated with silane or alumina—to form composites that are useful in providing opacity in coating compositions such as paint formulations, paper coatings, ink jet coatings, printing inks, sunscreens, nail polish, and wood coatings.

The formulation may also include any of a variety of other materials such as fillers; binders; rheology modifiers; dispersants, surfactants; defoamers; preservatives; flow agents; leveling agents; and neutralizing agents. It has been discovered that the composites confer additional hiding benefits for the formulation as compared with non-composite forming aqueous blends of opaque polymer and pigment particles.

In a second aspect, the present invention is a composite comprising an aqueous dispersion of phosphorus acid functionalized core-shell polymer particles adsorbed to $TiO_2$ particles, wherein the core comprises water having a pH of at least 6 and not more than 10; wherein the average diameter of the core is from 200 nm to 1.4 μm, and the average diameter of the core-shell particles is from 225 nm to 1.6 μm; wherein the shell comprises a) from 50 to 99.8% of a polymer or a copolymer having a $T_g$ of not less than 50° C. and a refractive index of from 1.4 to 2; and b) from 0.1 to 5 weight percent structural units of a phosphorus acid monomer.

The phosphorus acid functionalized core-shell polymer particles have a preferred final core diameter in the range of from 250 nm, and more preferably from 275 nm, to preferably 500 nm, more preferably to 400 nm, and most preferably to 350 nm, as determined by the void fraction measurement described in the Examples Section. The diameter of the final core-shell polymer particles is preferably in the range of from 250 nm, more preferably from 275 nm, and most preferably from 300 nm, to preferably 550 nm, more preferably to 425 nm, and most preferably to 375 nm, as determined using a BI90 Plus Particle Size Analyzer. The void fraction of the final core-shell polymer particles (that is, the volume of the final core to the total volume of the final core-shell polymer particles) is preferably in the range of from 30%, more preferably from 35%, and most preferably from 40%, to preferably 70%, more preferably to 60%, and most preferably to 46%.

EXAMPLES

Abbreviations

| | |
|---|---|
| NaPS | Sodium Persulfate |
| MMA | Methyl Methacrylate |
| MAA | Methacrylic Acid |
| AA | Acrylic Acid |
| SDS | Sodium Dodecylsulfate (23% aq) |
| STY | Styrene |
| AN | Acrylonitrile |
| EDTA | Ethylenediaminetetraacetic Acid Tetrasodium salt |
| IAA | Isoascorbic Acid |
| BA | Butyl Acrylate |
| DVB | Divinyl Benzene |
| 4-hydroxy TEMPO | 4-Hydroxy-2,2,6,6-tetramethylpiperidin-1-oxyl |
| t-BHP | t-Butylhydroperoxide |
| PEM | Phosphoethyl Methacrylate (60% active) |
| ALMA | Allyl Methacrylate |
| PS | Particle Size |

Comparative Example 1—Preparation of an Opaque Polymer without Phosphorus Acid Functionality To a 5-liter, four necked round bottom flask was equipped with paddle stirrer, thermometer, nitrogen inlet, and reflux condenser was added DI water (700 g) under $N_2$. The contents were heated 89° C., whereupon NaPS (3.40 g) dissolved in DI water (40 g) was added followed immediately by the addition of 66 MMA/34 MAA seed material prepared substantially as described in U.S. Pat. No. 6,020, 435, Examples 1-16 (200.00 g, 32% solids, PS=140 nm, by BI90 Plus Particle Size Analyzer).

A first monomer emulsion (ME I), which was prepared by mixing DI water (320 g), SDS (15.9 g), STY (803.0 g), AN (90.2 g), and linseed oil fatty acid (3.5 g) was added to the kettle at a rate of 6.0 g/min at a temperature of 78° C. Two minutes after the start of the ME I addition, a solution of AA (9.0 g) mixed with DI water (50 g) was added to the kettle. After 30 min from the start of the ME I addition, the feed rate was increased to 12 g/min, and a mixture of sodium persulfate (0.85 g) dissolved in DI water (40 g) was co-fed to the kettle at a rate of 1.0 g/min. The temperature of the reaction mixture was then allowed to increase to 84° C. After 45 min from the start of the ME I addition, the feed rate was increased to 24 g/min and the temperature was allowed to increase to 92° C. After 60 min from the start of the ME I addition, the feed rate was increased to 30 g/min. Upon completion of the ME I and co-feed additions, a solution of ferrous sulfate (0.02 g) dissolved in DI water (20 g) was mixed with a solution of EDTA (0.02 g) dissolved in two g of DI water. This mixture was added to the kettle along with a separate solution of IAA (0.71 g) dissolved in DI water (20 g). The batch was then held at 90° C. for 15 min; a second monomer emulsion (ME II), which was prepared by mixing DI water (40 g), SDS (3.4 g), BA (107.0 g), DVB (37.72 g) and 4-hydroxy TEMPO (2.5 g) was added to the kettle at a rate of 45 g/min along with hot DI water (900 g). A solution of ammonium hydroxide (40.0 g, 28% aq) in DI water (40 g) of was then added to the kettle over 5 min. The batch was then held for five min at 85° C., after which time a solution t-BHP (1.5 g) mixed with DI water (40 g) and a solution of IAA (0.85 g) mixed with DI water (40 g) was co-feed to the kettle at a rate of 0.8 g/min. After completion of the t-BHP and IAA co-feed, the batch was cooled to room temperature and filtered to remove any coagulum formed. The final latex had a solids content of 30.5%.

Examples 1-5—Preparation of Phosphoethyl Methacrylate Functionalized Opaque Polymer The Examples were prepared by the procedure of Comparative Example 1 except that for Examples 1-3, PEM was added to the ME1tank after 75% of ME1 was added to the kettle; for Examples 4-5, PEM was added to the ME1tank after 33% of ME1 was added to the kettle.

Void Fraction Determination

Void fraction of the opaque polymers was determined using three separate bulking cup weight measurements. For the first measurement, a triethylene glycol (TEG)-water blank is prepared by placing TEG (90.00 g) and water (10.00 g) in a 4-oz jar. The TEG and water were stirred to form a thoroughly dispersed mixture, which was poured into a tared bulking cup. The weight of this mixture (the blank, designated BL for ensuing calculations) was obtained. The second measurement was obtained by pouring the opaque polymer emulsion into a tared bulking cup and obtaining the weight of the opaque polymer emulsion (designated OP for ensuing calculations). For the third measurement, a mixture of TEG and opaque polymer emulsion was prepared by placing TEG (90.00 g) with stirring into a 4-oz jar. Opaque polymer emulsion was added to the jar that was calculated to be equal to the amount of emulsion that contains 10.00 g of water. Within 2 min of adding the aliquot of opaque polymer mixture, designated "OP-A" for ensuing calculations) was obtained.

Void fractions of the opaque polymers were in accordance with the below equations. In addition to the values obtained through the bulking cup measurements, the solids content of the opaque polymer emulsion also must be known ("Solids"). The result of the calculations is the void fraction (% VF) of the opaque polymer.

Equation Nomenclature

| | |
|---|---|
| BL | Weight of the TEG/water blank (in grams) |
| OP | Weight of the opaque polymer emulsion (in grams) |

-continued $$OPa = \frac{10}{1 - \text{Solids}}$$

$$TEGS = \frac{OP \times \text{Solids}}{OPa + 90}$$

Determination of the Opaque Polymer Void Diameter

The void diameter of the opaque polymer can be calculated using the particle size of the opaque polymer particle and the void fraction of the opaque polymer particle. The void diameter was calculated as follows:

Void Diameter=$(\% \ VF \times (PS/2)^3)^{1/3}$

Table 1 Stage ratio refers to the ratio of the Core to the Inner Shell (ME I) to the Outer Shell (ME II).

TABLE 1

Compositions of Opaque Polymers

| Ex. No. | 1 | 2 | 3 | 4 | 5 | Comp. 1 |
|---|---|---|---|---|---|---|
| PEM %[a] | 0.5 | 1.0 | 1.5 | 1.5 | 1.5 | 0 |
| Stage ratio | 1:14:2.14 | 1:14:2.14 | 1:14:2.14 | 1:14:2.14 | 1:14:2.14 | 1:14:2.14 |
| Core MMA:MAA | 66:34 | 66:34 | 66:34 | 66:34 | 66:34 | 66:34 |
| Core PS (nm) | 140 | 140 | 140 | 83 | 108 | 140 |
| ME I | | | | | | |
| STY | 88.42 | 87.85 | 87.3 | 91.45 | 91.45 | 89 |
| AN | 10 | 10 | 10 | 5 | 5 | 10 |
| AA | 1.0 | 1.73 | 1.0 | 0 | 0 | 1.0 |
| MAA | 0 | 0 | 0 | 1.5 | 1.5 | 0 |
| PEM[a] | 0.58 | 1.15 | 1.73 | 1.8 | 1.8 | 0 |
| ALMA | 0 | 0 | 0 | 0.25 | 0.25 | 0 |
| ME II | | | | | | |
| BA | 78 | 78 | 78 | 0 | 0 | 78 |
| STY | 0 | 0 | 0 | 100 | 100 | 0 |
| DVB | 22 | 22 | 22 | 0 | 0 | 22 |
| Particle Size | 458 | 375 | 360 | 270 | 330 | 423 |
| Void Fraction | 40.0 | 37.9 | 37.2 | 38.1 | 42 | 39.4 |

[a] unadjusted for PEM activity (60% of reported amount).

-continued

| | |
|---|---|
| $OP_a$ | Weight of the opaque polymer emulsion/TEG mixture (in grams) |
| Solids | Percent of the opaque polymer emulsion that remains solid when dried, expressed as a decimal between 0 and 1 |
| WBV | Wet bulking value of the opaque polymer emulsion |
| DBV | Dry bulking value of the opaque polymer |
| SBV | Bulking value of the solid opaque polymer |
| TEGS | Intermediate calculation value associated with the TEG and solids content |
| PS | Particle Size |
| % VF | Void fraction of the opaque polymer, express as a percentage |

Calculation of the Void Fraction $$\% \ VF = 1 - \frac{SBV}{DBV}$$

wherein, $$SBV = \left(1 - \frac{(1 - \text{Solids}) \times 0.1202}{WBV}\right) \times \frac{WBV}{\text{Solids}}$$

$$DBV = \frac{10}{TEGS} \times \left(\frac{1}{OPa} - \frac{(1 - TEGS)}{BL}\right)$$

$$WBV = \frac{10}{OP}$$

The opaque polymers were formulated into paints in accordance with Table 2. (ACRYSOL and RHOPLEX are Trademarks of The Dow Chemical Company or its Affiliates.)

TABLE 2

Paints Formulated with Opaque Polymers

| Material Name | Kg | L |
|---|---|---|
| Premix | | |
| OP | 30.56 | 2.08 |
| Ammonia (28% aq.) | 0.48 | 0.04 |
| Water | 23.56 | 1.64 |
| Foamstar A-34 Defoamer | 0.48 | 0.03 |
| Kronos 4311 TiO$_2$ | 136.38 | 4.07 |
| Premix Sub-total | 191.46 | 7.87 |
| LetDown | | |
| RHOPLEX ™ VSR-1050 Binder | 214.09 | 14.25 |
| Texanol Coalescent | 6.04 | 0.44 |
| ACRYSOL ™ RM-2020 NPR Rheology Modifier | 6.96 | 0.46 |
| ACRYSOL ™ RM-8W Rheology Modifier | 2.25 | 0.15 |
| Water | 46.45 | 3.24 |
| Total | 467.25 | 26.42 |

Kubelka-Munk S/mil Test Method

Four draw-downs were prepared on Black Release Charts (Leneta Form RC-BC) for each paint using a 1.5-mil Bird draw down bar and the charts allowed to dry overnight. Using a template, 3.25"×4" rectangles were cut out on each chart. The Y-reflectance was measured using a X-Rite Color i7 Spectrophotometer in each of the scribed areas five times and the average Y-reflectance recorded. A thick film draw down was prepared for each paint on the Black Release Charts using a 3", 25-mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1 - R^2)} \times \ln\left[\frac{1 - (R_B \times R)}{1 - \frac{R_B}{R}}\right] \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in².

$$X(\text{mils}) = \frac{W_{pf}(g) \times 1000(\text{mil/in})}{D(\text{lbs/gal}) \times 1.964(g/\text{in}^3/\text{lbs/gal}) \times A(\text{in})}$$

The Hiding (S/mil) data for Paint Examples and Comparative Example are summarized in Table 3.

TABLE 3

Dry Hiding for Paint Samples

| | Ex. 1 | Ex. 2 | Ex. 3 | Ex. 4 | Ex. 5 | Comp. Ex. 1 |
|---|---|---|---|---|---|---|
| PEM %[a] | 0.5% | 1% | 1.5% | 1.5% | 1.5% | 0% |
| Dry S/mil | 6.29 | 6.42 | 6.65 | 6.52 | 6.50 | 6.15 |
| Stdev | 0.03 | 0.05 | 0.03 | 0.06 | 0.07 | 0.00 |

[a]unadjusted for PEM activity (60% active)

The data show that the PEM-functionalized samples all exhibit higher dry hiding than the sample containing the non-PEM functionalized opaque polymer. Evidence of composite formation between the PEM-functionalized opaque polymer and the $TiO_2$ was found using Asymmetric Flow Field Flow Fractionation fractograms, which showed an increase in particle size as compared with the unfunctionalized opaque polymer. The mixture of VSR 1050 binder, the non-PEM-functionalized opaque polymer, and the $TiO_2$ particles showed a bimodal distribution of particles at 120 nm (the binder) and about 400 nm (an unbound mixture of the opaque polymer and $TiO_2$); the mixture containing the binder, the PEM-functionalized opaque polymer, and the $TiO_2$ gave a trimodal distribution of particles at 120 nm, 300 nm (unbound $TiO_2$), and a peak at about 700 nm, which shows evidence of opaque polymer-$TiO_2$ composite formation.

The invention claimed is:

1. A method for preparing an aqueous dispersion of phosphorus acid functionalized core-shell polymer particles comprising the steps of a) contacting under emulsion polymerization conditions i) a first monomer emulsion with ii) an aqueous dispersion of carboxylic acid functionalized polymer particles having an average particle size of from 80 to 180 nm to form an aqueous dispersion of core-shell polymer particles; then b) plasticizing the shell portion of the core-shell polymer particles with a polymerizable plasticizing agent; then c) contacting the core-shell polymer particles with an aqueous base to swell the core without substantially polymerizing the plasticizing agent; and then d) polymerizing the plasticizing agent;

wherein the first monomer emulsion comprises, based on the weight of the monomers in the first monomer emulsion a) from 0.1 to 5 weight percent of a phosphorus acid monomer; and b) from 50 to 99.8 weight percent of at least one first nonionic ethylenically unsaturated monomer selected from the group consisting of styrene, methyl methacrylate, acrylonitrile, and t-butyl acrylate; and c) from 0.1 to 15 weight percent of a carboxylic acid functionalized monomer;

wherein the carboxylic acid functionalized polymer particles comprise from 20 to 50 weight percent structural units of a carboxylic acid monomer, based on the weight of the carboxylic acid functionalized polymer particles; and 50 to 80 weight percent of structural units of a second nonionic ethylenically unsaturated monomer, based on the weight of the carboxylic acid functionalized polymer particles;

wherein the plasticizing agent comprises from 7 to 30 percent of a third nonionic ethylenically unsaturated monomer based on the weight of the phosphorus acid functionalized core-shell polymer particles;

wherein the phosphorus acid functionalized core-shell polymer particles have an average particle size after step d) in the range of 250 nm to 1.6 μm.

2. The method of claim 1, wherein the concentration of the phosphorus acid monomer in the first monomer emulsion is from 0.2 to 3 weight percent based on the weight of the monomers in the first monomer emulsion; wherein the concentration of the first nonionic ethylenically unsaturated monomer in the first monomer emulsion is from 70 to 95 weight percent, and wherein the concentration of the carboxylic acid functionalized monomer in the first monomer emulsion is from 0.2 to 0.5 weight percent, all based on the weight of the monomers in the first monomer emulsion; and wherein the plasticizing agent comprises from 10 to 25 weight percent, based on the weight of the core-shell polymer particles.

3. The method of claim 2, wherein the concentration of the structural units of the carboxylic acid monomer in the acid functionalized polymer particles is from 25 to 40 weight percent and wherein the concentration of the structural units of the second nonionic ethylenically unsaturated monomer is from 60 to 75 weight percent, based on the weight of the acid functionalized polymer particles; and wherein acid functionalized polymer particles have an average particle size of from 125 nm to 150 nm.

4. The method of claim 3, wherein the first monomer emulsion further comprises from 0.1 to 10 weight percent of a diethylenically or triethylenically unsaturated monomer selected from the group consisting of allyl methacrylate, divinyl benzene, ethylene glycol diacrylate, ethylene glycol dimethacrylate, trimethylolpropane triacrylate, and trimethylolpropane trimethacrylate.

5. The method of claim 3, wherein the phosphorus acid monomer is phosphoethyl methacrylate, wherein the concentration of structural units of the carboxylic acid monomer acid in the acid functionalized polymer particles is from 32 to 36 weight percent, and the concentration of structural units of the second nonionic ethylenically unsaturated monomer is 64 to 68 weight, wherein the carboxylic acid monomer is acrylic acid or methacrylic acid, and wherein the second nonionic ethylenically unsaturated monomer is methyl methacrylate.

6. The method of claim 5, wherein the first monomer emulsion comprises from 0.5 to 2 weight percent phosphoethyl methacrylate, based on the weight of the monomers in the first monomer emulsion; and from 0.5 to 5 weight percent the acrylic acid or methacrylic acid.

7. The method of claim 1, wherein in step a), the first monomer emulsion is added to the aqueous dispersion of the acid functionalized polymer particles under emulsion polymerization conditions over a first period of time, and the phosphorus acid monomer portion of the first monomer emulsion is added to the aqueous dispersion of the acid functionalized polymer particles over a second period of time that is less than 60% of the first period of time.

8. The method of claim 7, wherein the phosphorus acid monomer addition is delayed until 40% to 75% of the first monomer emulsion, absent the phosphorus acid monomer, is added to the aqueous dispersion of the carboxylic acid functionalized polymer particles.

9. The method of claim 8, wherein the polymerization of the first monomer emulsion with the aqueous dispersion of acid functionalized polymer particles is allowed to proceed to at least 98% conversion of monomers to the core-shell polymer particles, after which time an inhibitor is contacted with the aqueous dispersion of the core-shell polymer particles to stop or substantially stop polymerization.

10. The method of claim 9, wherein the polymerizable plasticizing agent is added at a concentration of from 12 to 20 weight percent, based on weight of the phosphorus acid functionalized core-shell polymer particles, wherein the plasticizing agent is styrene or methyl methacrylate, or a combination of a) butyl acrylate and b) divinyl benzene or allyl methacrylate, wherein the aqueous base is NaOH, KOH, or $NH_4OH$.

11. The method of claim 10, wherein less than 0.01 percent of the polymerizable plasticizing agent remains after it is polymerized.

12. A method for preparing an aqueous dispersion of composite particles comprising the method of claim 1, wherein after step d), the aqueous dispersion of phosphorus acid functionalized core-shell polymer particles are admixed with $TiO_2$ particles to form an aqueous dispersion of composite particles.

* * * * *